(12) United States Patent
Yokoyama

(10) Patent No.: US 7,916,733 B2
(45) Date of Patent: Mar. 29, 2011

(54) DATA COMMUNICATION APPARATUS, DATA COMMUNICATION METHOD, PROGRAM, AND STORAGE MEDIUM

(75) Inventor: Hidehiko Yokoyama, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 12/247,078

(22) Filed: Oct. 7, 2008

(65) Prior Publication Data

US 2009/0034535 A1 Feb. 5, 2009

Related U.S. Application Data

(63) Continuation of application No. 11/143,821, filed on Jun. 2, 2005, now Pat. No. 7,596,136.

(30) Foreign Application Priority Data

Jun. 4, 2004 (JP) .................................. 2004-167546

(51) Int. Cl.
*H04L 12/28* (2006.01)

(52) U.S. Cl. .................................. 370/395.3; 370/395.4
(58) Field of Classification Search .................. None
See application file for complete search history.

(56) References Cited

U.S. PATENT DOCUMENTS

| 5,420,862 | A * | 5/1995 | Perlman | 370/401 |
| 6,961,336 | B2 * | 11/2005 | Coggeshall | 370/389 |
| 7,596,136 | B2 * | 9/2009 | Yokoyama | 370/389 |
| 2009/0034535 | A1 * | 2/2009 | Yokoyama | 370/395.54 |

* cited by examiner

*Primary Examiner* — Robert W Wilson
(74) *Attorney, Agent, or Firm* — Canon U.S.A., Inc. I.P. Division

(57) ABSTRACT

An information processing apparatus functioning as a data communication apparatus determines whether data communication with another information processing apparatus in the same local network is carried out using a global network address. If it is determined that the data communication is carried out using a global network address, the information processing device carries out control so that the data communication is carried out using a local network address.

4 Claims, 6 Drawing Sheets

DATA COMMUNICATION APPARATUS, DATA COMMUNICATION METHOD, PROGRAM, AND STORAGE MEDIUM

CROSS REFERENCE TO RELATED APPLICATIONS

This application is a continuation of U.S. patent application Ser. No. 11/143,821 filed Jun. 2, 2005, which claims priority from Japanese Patent Application No. 2004-filed Jun. 4, 2004, the entire contents of which are both hereby incorporated by reference herein.

BACKGROUND OF THE INVENTION

1. Field of the Invention

The present invention relates to a method and a system in which information processing devices connected to the same local network can securely communicate with each other. In this local network, information processing devices can directly communicate with each other without a data relay device known as a router.

2. Description of the Related Art

In known communication methods and systems, when information processing devices connected with each other via any communication means carry out data communication, a global address is used. A global address is disclosed in, for example, a document by R. Hinden, M. O'Dell, and S. Deering, July 1998, available at the Internet:<URL:http://www.i-etf.org/rfc/rfc2374.txt>. A global address is a unique network address not only in the same network but also in different networks. When an information processing device is connected to the same network as a target communication information processing device and can directly communicate with the target communication information processing device without a router, a link-local address is used. The link-local address is disclosed in, for example, a document by R. Hinden and S. Deering, April 2003, available at the Internet:<URL: http://www.ietf.org/rfc/rfc3513.txt>. Although a link-local address is unique in the same local network, the uniqueness of link-local address is not guaranteed in different networks.

However, in the known technologies, when an information processing device uses a global address for data communication, an information processing device belonging to a different network can connect to the information processing device. Accordingly, if a malicious user happens to know the global address of the information processing device, the malicious user could start a Denial-of-Service (DoS) attack against the information processing device. The DoS attack disables the communication of the information processing device by continuously transmitting a large amount of data. Also, global addresses are widely disclosed by a DNS (domain name service) and are fixed numbers. Thus, the communication using global addresses is vulnerable to sniffer attacks, which is a problem.

SUMMARY OF THE INVENTION

The present invention provides a data communication method and system for reducing the risk of being subjected to Denial-of-Service (DoS) attacks and sniffer attacks against an information processing device carrying out communication using a global address.

According to an aspect of the present invention, a data communication apparatus in a first local network includes a communication unit configured to carry out data communication with a first other data communication apparatus in the first local network and a second other data communication apparatus in a second local network wherein the communication unit is configured to carry out data communication using a local network address for allowing communication with the first other data communication apparatus in the first local network and carry out data communication using a global network address for allowing communication with the first other data communication apparatus in the first local network and the second other data communication apparatus in the second local network. The data communication apparatus further includes a detection unit configured to detect a connection request from another data communication apparatus and a control unit configured to control the communication unit to carry out data communication with the another data communication apparatus using a local network address when the another data communication apparatus sending the connection request detected by the detection unit employs a global network address and is located in the first local network.

The data communication apparatus can further include, for example, a determination unit configured to determine whether the connection request from the another data communication apparatus is transmitted via a network relay device for connecting the first local network to the second local network, wherein the control unit is configured to determine whether the another data communication apparatus is located in the first local network based on the determination result by the determination unit.

The data communication apparatus can further include, for example, an address change requesting unit configured to request the another data communication apparatus to employ a local network address when the another data communication apparatus sending the connection request detected by the detection unit is located in the first local network and sends the connection request using a global network address and a network address acquiring unit configured to acquire the local network address of the another communication apparatus based on a response from the another communication apparatus to the request from the address change requesting unit, wherein, when the network address acquiring unit acquires the local network address of the another communication apparatus, the control unit carries out control to disconnect a connection between the communication unit and the another data communication apparatus using a global network address and to establish connection again between the communication unit and the another data communication apparatus using the local network address so as to resume the communication.

In the data communication device, for example, the local network address acquired by the network address acquiring unit is encrypted, and the data communication apparatus further include a decrypting unit configured to decrypt the encrypted local network address acquired by the network address acquiring unit.

The data communication apparatus can further include, for example, a storage unit configured to store the local network address acquired by the network address acquiring unit, wherein the control unit carries out control to disconnect connection with the another communication apparatus sending the connection request detected by the detection unit when the another communication apparatus employs a local network address not identical to the local network address stored in the storage unit.

In the data communication device, for example, the control unit is configured to carry out control to communicate with the another communication apparatus whose connection request is detected by the detection unit using a global network address when the another communication apparatus is not an apparatus in the first local network.

According to another aspect of the present invention, a data communication apparatus in a first local network includes a communication unit configured to carry out data communication with a first other data communication apparatus in the first local network and with a second other data communication apparatus in a second local network, wherein the communication unit is configured to carry out data communication using a local network address for allowing communication with the first other data communication apparatus in the first local network and carrying out data communication using a global network address for allowing communication with the first other data communication apparatus in the first local network and the second other data communication apparatus in the second local network. The data communication apparatus further includes a connection requesting unit configured to cause the communication unit to send a connection request to another data communication apparatus, an address change request detecting unit for detecting that the communication unit receives, from the another data communication apparatus, a request for employing a local network address in response to the connection request, and a creation unit configured to create a local network address when the address change request detecting unit detects a reception of the request for employing a local network address, wherein the communication unit is configured to send the local network address created by the creation unit to the another data communication apparatus.

In the data communication apparatus, for example, the creation unit creates the local network address based on a random number.

The data communication apparatus can further include, for example, a checking unit configured to check whether the local network address created by the creation unit based on the random number has already been used in the first local network, wherein the creation unit is configured to create, based on the check of the checking unit, a new local network address when the local network address created by the creation unit based on the random number has already been used in the first local network, and wherein the communication unit sends, to the another data communication apparatus, the local network address created by the creation unit based on the random number when the local network address has not yet been used in the first local network.

According to another aspect of the present invention, a data communication method is provided for a data communication apparatus capable of carrying out data communication using a local network address for allowing communication with a data communication apparatus only in the local network and carrying out data communication using a global network address for allowing communication with a data communication apparatus in the local network and a data communication apparatus in another local network. The method includes a detection step for detecting a connection request from another data communication apparatus and a control step for carrying out control to communicate with the another data communication apparatus using a local network address when the another data communication apparatus requesting the connection request detected at the detection step employs a global network address and is located in the local network.

According to another aspect of the present invention, a data communication method is provided for a data communication apparatus capable of carrying out data communication using a local network address for allowing communication with a data communication apparatus only in the local network and carrying out data communication using a global network address for allowing communication with a data communication apparatus in the local network and a data communication apparatus in another local network. The method includes a connection requesting step for sending a connection request to another data communication apparatus, an address change request detecting step for detecting a reception of a request for employing a local network address from the another data communication apparatus in response to the connection request, a creation step for creating a local network address when the address change request detecting step detects a reception of the request for employing a local network address, and a local network address notification step for notifying the another data communication apparatus of the local network address created at the creation step.

According to another aspect of the present invention, a computer program includes program code for causing a computer to execute a data communication method according to either of the methods described above.

According to another aspect of the present invention, a computer-readable storage medium stores the above-described computer programs.

Further features and advantages of the present invention will become apparent from the following description of exemplary embodiments with reference to the accompanying drawings.

DESCRIPTION OF THE EMBODIMENTS

Embodiments of the present invention will be described in detail below with reference to the accompanying drawings.

First Embodiment

Figure 1:
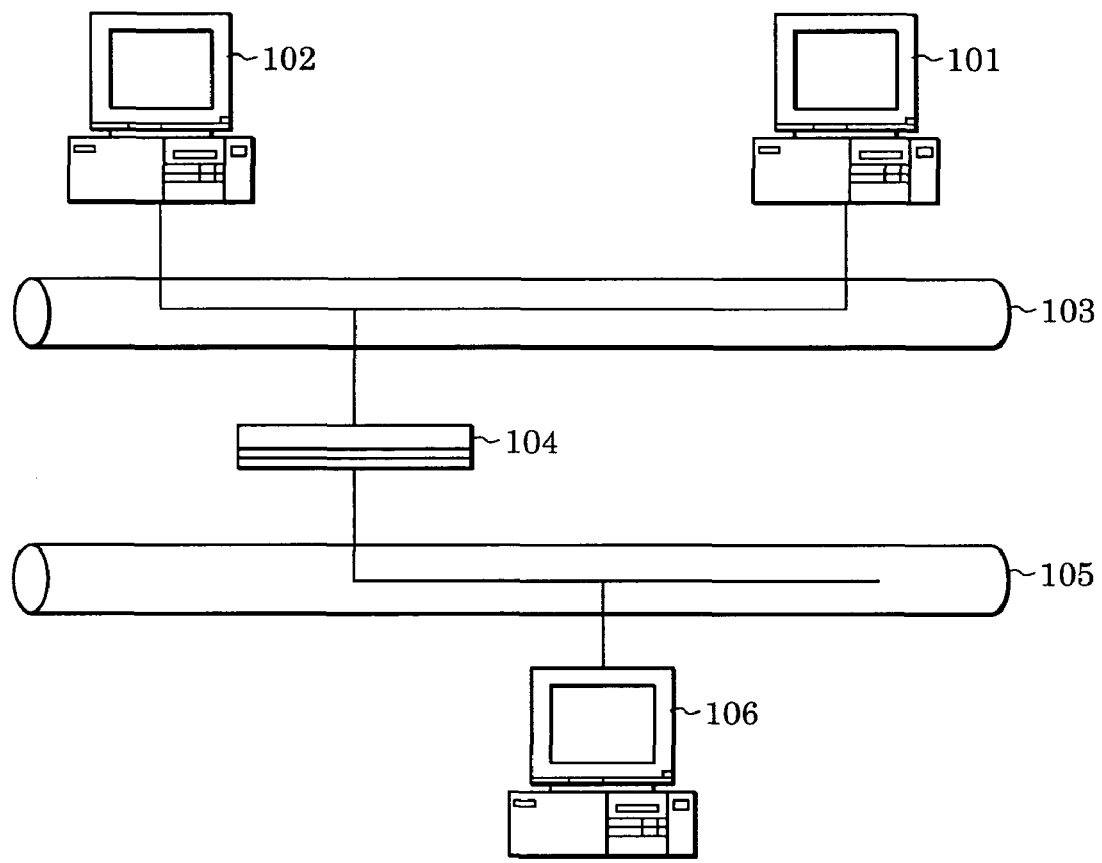
FIG. 1 is a diagram illustrating the structure of a communication system according to an embodiment of the present invention.

FIG. 1 is a diagram illustrating the structure of a communication system according to an embodiment of the present invention. Information processing devices (apparatus) 101 and 102 functioning as data communication devices (apparatuses) are connected to a local area network (LAN) 103, such as Ethernet. The information processing devices 101 and 102 can directly communicate with each other without intervention of a third party. A router 104 relays or stops data between the LAN 103 and a LAN 105. An information processing devices 106 is connected to the LAN 105 so as to communicate with the information processing devices 101 and 102 on the LAN 103 via the router 104.

Figure 6:
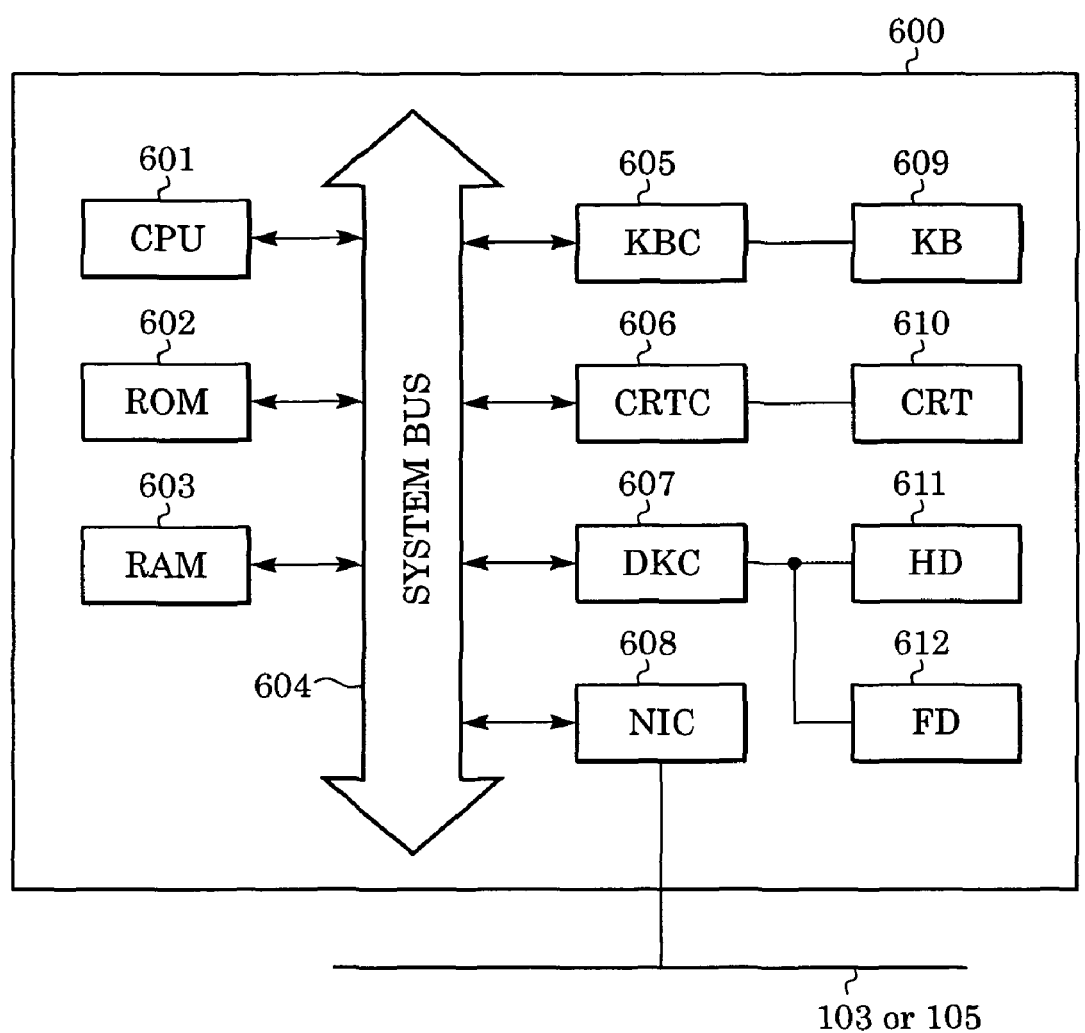
FIG. 6 is a block diagram of the hardware configuration of information processing devices shown in FIG. 1.

FIG. 6 is a block diagram of the hardware configuration of the information processing devices 101, 102, and 106 shown in FIG. 1. As shown in FIG. 6, the hardware configuration includes a central processing unit (CPU) 601, a read only memory (ROM) 602, a random access memory (RAM) 603, a keyboard controller (KBC) 605 of a keyboard (KB) 609, a CRT controller (CRTC) 606 of a CRT display 610 functioning as a display unit, a disk controller (DKC) 607 for controlling a hard disk (HD) 611 and a flexible disk (FD) 612, and a network interface card (NIC) 608, all of which can communicate with each other via a system bus 604.

The CPU 601 carries out overall control of the components connected to the system bus 604 by executing software stored in the ROM 602 or the HD 611, or by executing software supplied by the FD 612. That is, the CPU 601 reads out a program for realizing processes of flow charts, as described below in more detail, from the ROM 602, the HD 611, or the FD 612 and executes the program so that the CPU 601 controls the operation for realizing the processes of flow charts.

The RAM 603 serves as a main memory and a work area of the CPU 601. The KBC 605 controls input of instructions from the KB 609 and a pointing device (not shown). The CRTC 606 controls the display of the CRT 610. The DKC 607 controls accesses from the HDD 611 and the FD 612, which store a boot program, a variety of application programs, user files, network control programs, and a program that achieves the flow chart, as described below in more detail. The NIC 608 carries out bi-directional data communication with other devices on the LAN 103 or on the LAN 105.

Figure 2:
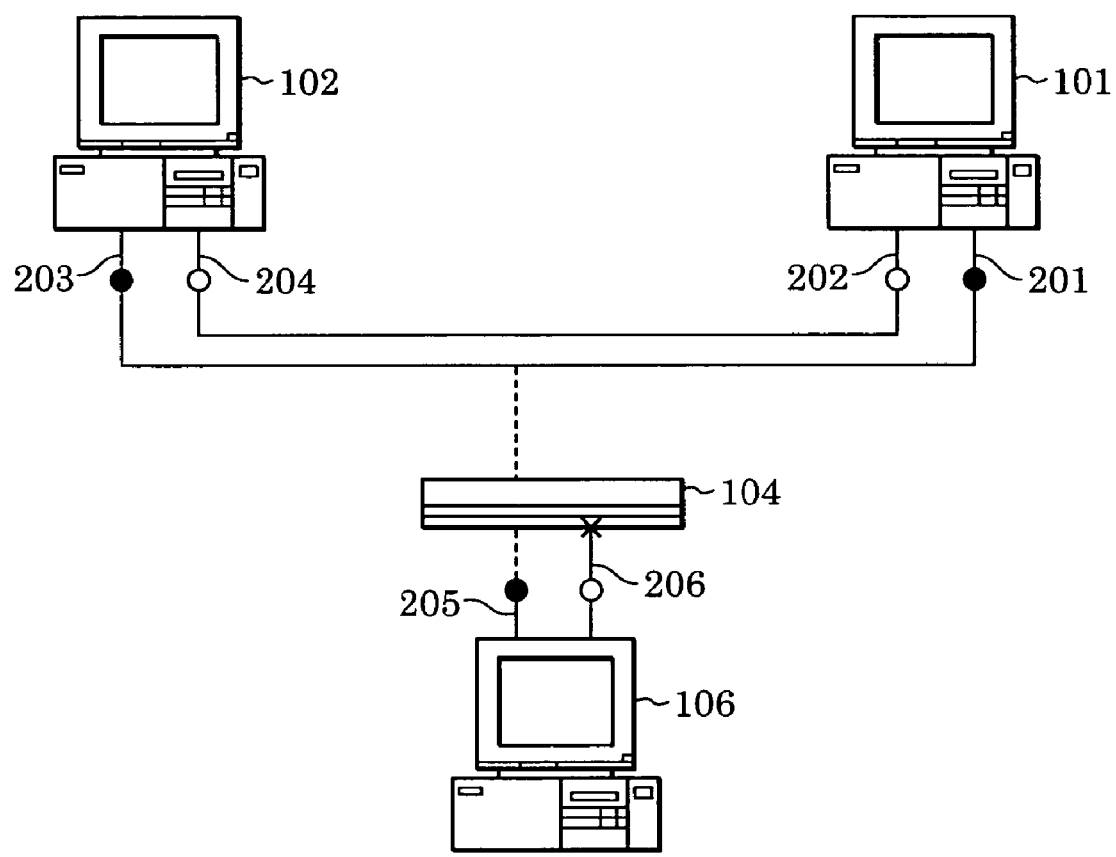
FIG. 2 shows availability of data communication in accordance with the address type of devices in the system configuration shown in FIG. 1.

FIG. 2 shows availability of data communication in accordance with the address type of devices in the system configuration shown in FIG. 1. The information processing devices 101, 102, and 106 have respective local addresses 202, 204, and 206, which allow the information processing devices to communicate with a device only in the same network, and respective global addresses 201, 203, or 205, which allow the information processing devices to communicate with a device in a different network via the router 104 in addition to a device in the same network. When the information processing device 101 communicates with the information processing device 102 in the same network, namely, via the LAN 103, the information processing devices 101 and 102 use the global addresses 201 and 203 or use the local addresses 202 and 204. However, when the information processing device 106 communicates with the information processing device 101, the local address 206 of the information processing device 106 is not accepted by the router 104 and the communication is blocked, and therefore, the information processing device 106 cannot communicate with the local address 202 of the information processing device 101. In contrast, when the information processing device 106 uses the global address 205, the communication can pass through the router 104. Accordingly, the information processing device 106 can communicate with the global address 201 of the information processing device 101.

Figure 3:
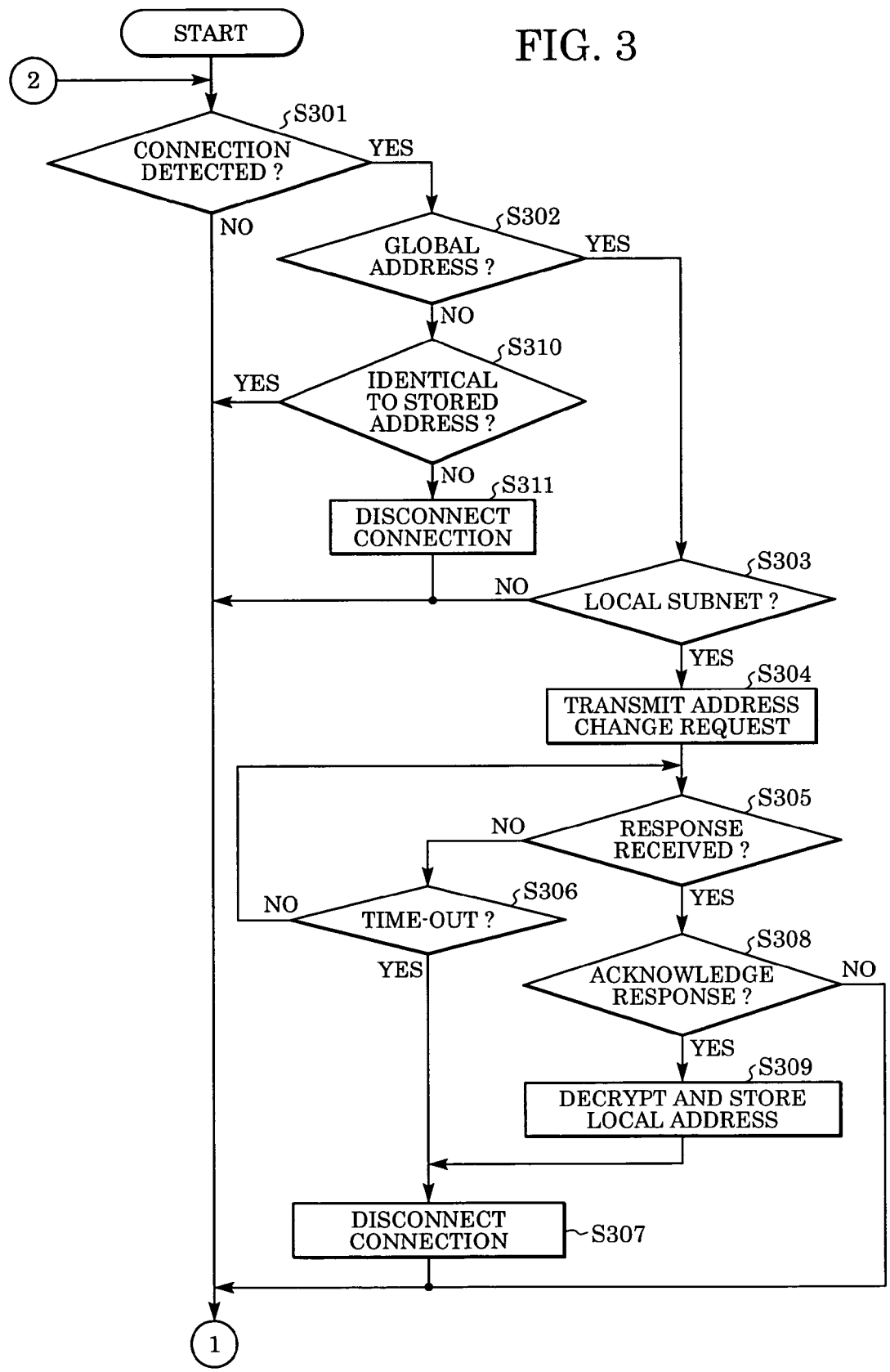
FIG. 3 is a flow chart of the operation of a communication system according to an embodiment of the present invention.
Figure 4:
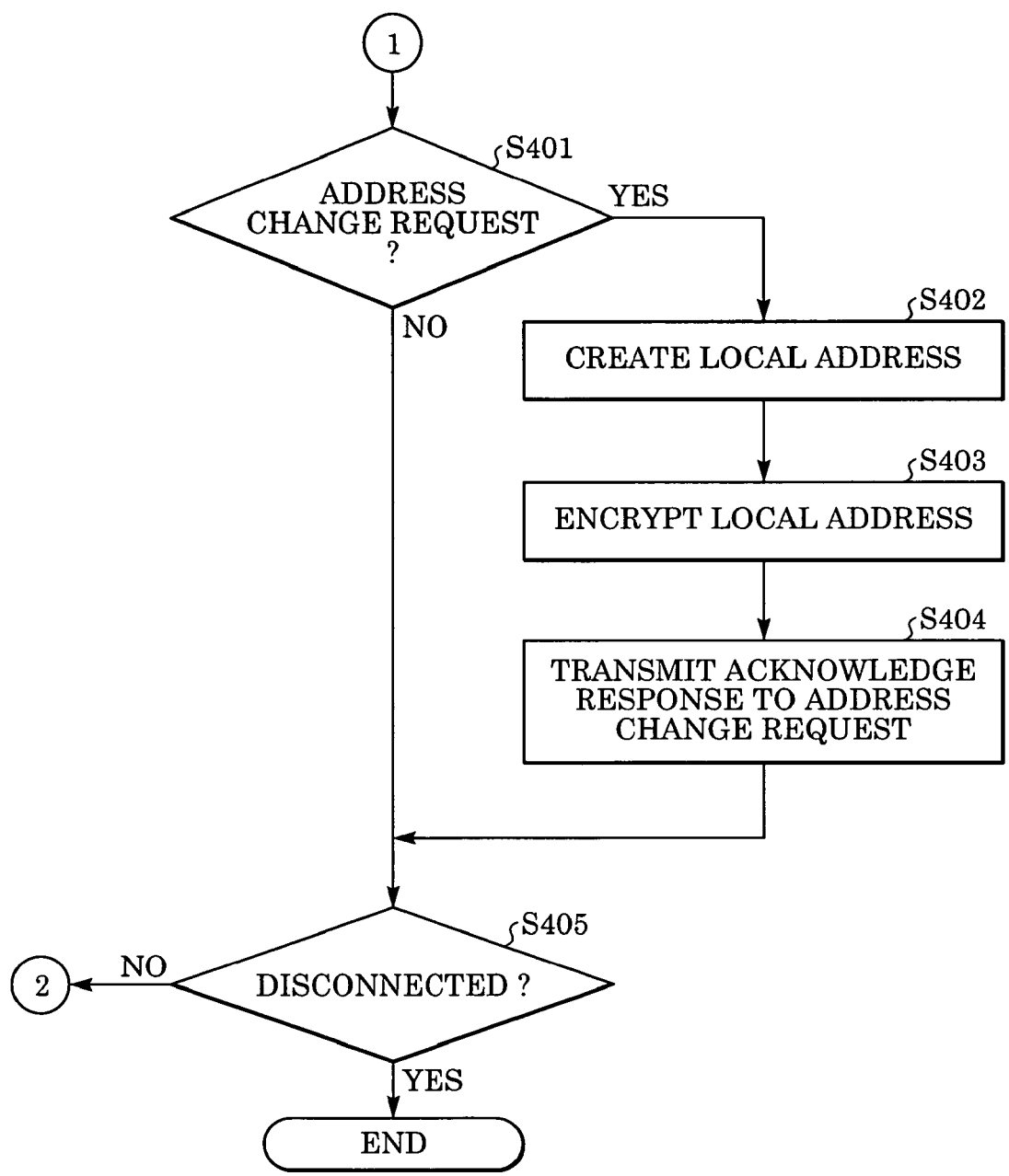
FIG. 4 is a flow chart of the operation of the communication system according to the embodiment of the present invention.
Figure 5:
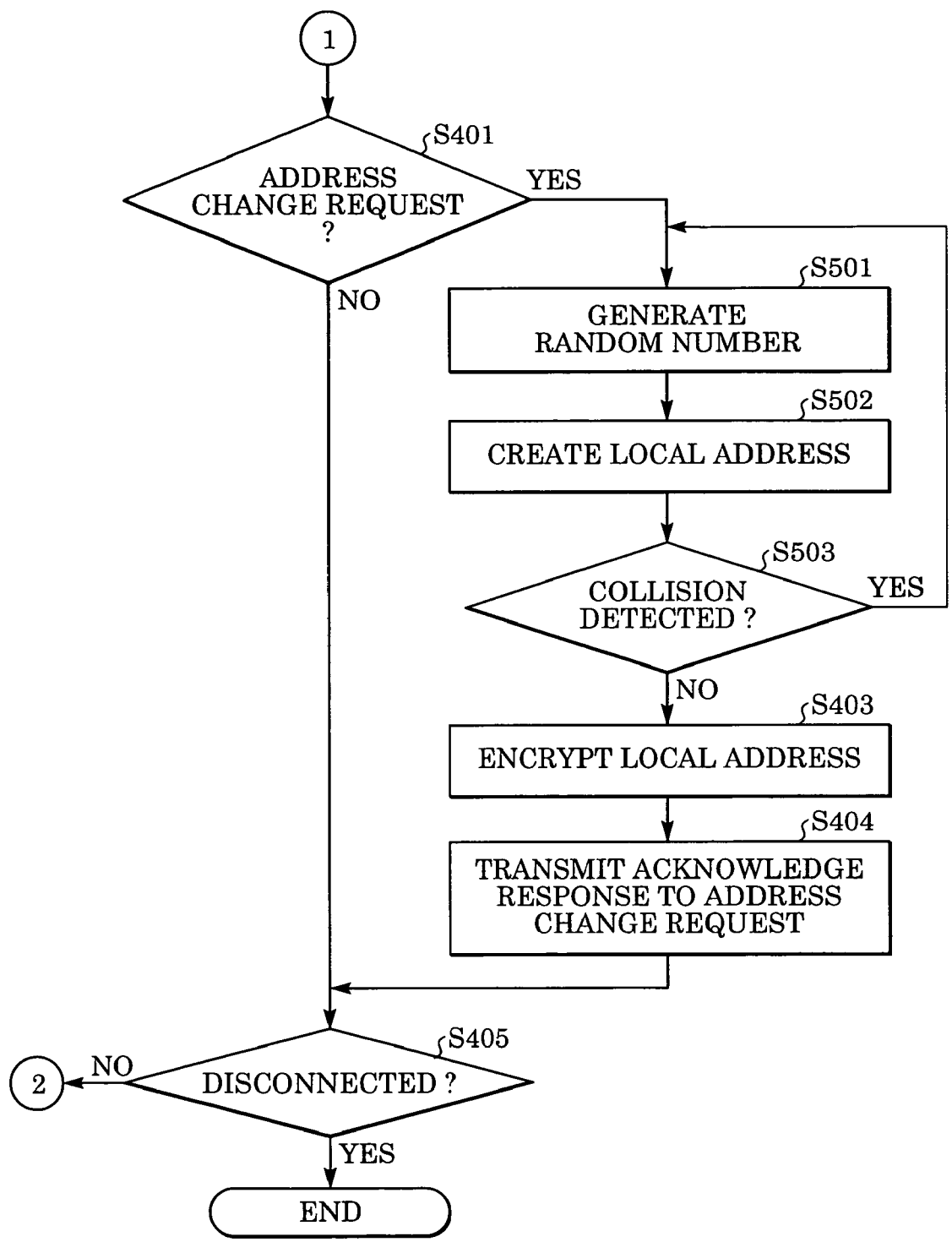
FIG. 5 is a flow chart of the operation of the communication system according to the embodiment of the present invention.

FIGS. 3, 4, and 5 show a flow chart illustrating a communication address change process in the information processing devices 101, 102, and 106 in the communication system shown in FIG. 1. The first embodiment will be described next with reference to FIGS. 3 and 4.

At step S301 in FIG. 3, it is determined whether a device receives a connection request from another device. If it is determined that the device receives no connection request, the process proceeds to step S401 in FIG. 4. If a connection request is received, it is determined, at step S302, whether the connection request is sent to a global address. If the connection request is not sent to a global address, that is, if the connection request is sent to a local address, it is then determined, at step S310, whether a local address of the requesting device is identical to a local address saved at step S309. The process at step S309 is described below. If they are identical to each other, the process proceeds to step S401, where data communication is carried out using the local addresses. However, if they are not identical, the connection request is considered as an unauthorized one. Therefore, at step S311, the connection is disconnected and the process proceeds to step S401. In this embodiment, the local address corresponds to a link-local address of the IPv6 (Internet Protocol Version 6) defined by RFC 3513.

If, at step S302, the connection request is for a global address, it is determined, at step S303, whether the data communication with the requesting device passes through a router based on whether or not the requesting device is connected to a local subnet. To determine whether or not the requesting device is connected to a local subnet, an ARP (address resolution protocol by RFC 826) packet having an address of the requesting device, which is written in a source address area of an IP packet, is sent to the requesting device. If a meaningful packet is returned, it is determined that the requesting device is connected to the local subnet.

If, at step S303, it is determined that the requesting device is not connected to a local subnet, that is, it is determined that the requesting device is connected to another network beyond a router, the communication using a local address cannot be carried out, and therefore, the process proceeds to step S401. However, if, at step S303, it is determined that the requesting device is connected to a local subnet, an address change request is transmitted at step S304. The address change request contains a local address of its own. If a device that received the address change request accepts the address change and the connection with the destination device is disconnected, the device re-connects to the local address. Subsequently, at step S305, it is determined whether a response to the address change request is received or not. If the response has not been received, it is determined, at step S306, whether a predetermined time-out period has elapsed.

If the predetermined time-out period has not elapsed, the process returns to step S305. If the predetermined time-out period has elapsed, some failure possibly occurs, and therefore, the connection is disconnected at step S307 and the process proceeds to step S401. If, at step S305, a response to the address change request is received, it is determined, at step S308, whether the response is an acknowledge response for the address change. If so, an encrypted local address contained in the acknowledge response is decrypted and is stored.

In the acknowledge response to the address change, the local address of the sender device is encrypted using a public key of the device (i.e., the device requesting the address change) in order to prevent sniffer attacks. Therefore, the local address must be decrypted using a secret key of the device. Upon completion of decrypting and storing the local address, the process proceeds to step S307. At step S307, the connection is disconnected and the process proceeds to step S401. In this embodiment, the local address, at step S309, is stored in the RAM 603 or in the HDD 611 shown in FIG. 6. If the address change request and the response to the address change request are successfully processed, the connection using a global address is disconnected, and a new connection using the local address contained in the response to the address change request is established.

Subsequently, at step S401 shown in FIG. 4, it is determined whether an address change request is received. If an address change request is not received, the process proceeds to step S405. This address change request is a request sent from another device after a device makes a connection request to another device using a global address. Upon receiving the address change request, a local address is created at step S402. In this embodiment, a link-local address of IPv6 is employed. In IPv6, a local address is referred to as a link-local address defined by RFC 3513. A link-local address consists of high 64 bits and low 64 bits. The high 64 bits are 0xfe80000000000000. The low 64 bits are a concatenation of high 24 bits (company id) of a device unique ID (i.e., 48-bit IEEE802 MAC address), 16 bits of 0xfffe, and low 24 bits (vendor unique ID) of the device unique ID. At step S403, the link-local address created at step S402 is encrypted using a public key of a device sending the address change request. At step S404, an acknowledge response to the request including the encrypted link-local address is sent and the process proceeds to step S405. At step S405, it is determined whether the connection is disconnected or not. If the connection is not disconnected, the process returns to step S301 in FIG. 3. Otherwise, the process is completed.

As described above, in the first embodiment, when an information processing device using a global address for data communication determines that a device requesting the connection is connected to the same network, the information processing device sends the device a request for changing to a local address. If the information processing device receives an acknowledge response corresponding to the local address change request, the subsequent communication between the information processing device and the device is carried out using local addresses thereof. That is, a global address is used only for the first negotiation and the local addresses are used for subsequent communication. Thus, the risk of being subjected to Denial-of-Service (DoS) attacks that target a global address and sniffer attacks during communication can be reduced.

Second Embodiment

In the first embodiment, a link-local address format defined by RFC 3513 is employed. By using a router, a link-local address can avoid DoS attacks and sniffer attacks by information processing devices in another network. However, the low 64 bits of the link-local address is created from a unique address of a network device attached to an information processing device. Therefore, once a malicious information processing device happens to know correspondence between an information processing device and a link-local address in the same network, the information processing device may be a target of DoS attacks and sniffer attacks.

Since link-local addresses are used only for information processing devices in the same network, there is no problem from an operational point of view as long as the link-local addresses are unique in the same network. Thus, instead of assigning a unique address of an information processing device to the low 64 bits of a link-local address, any 64-bit number generated by a random number generation function may be assigned. That is, this random number can be combined with the above-described high 64 bits, which starts with 0xfe80, so as to generate a link-local address.

A flow chart in FIG. 5 shows a link-local address generation process which is updated from the flow chart shown in FIG. 4. The processing shown in FIG. 3 and described above with reference to the first embodiment is performed prior to the processing shown in FIG. 5. In the flow chart in FIG. 5, a link-local address is created using a random number. Upon receiving an address change request at step S401, an information processing device, at step S501, generates a 64-bit random number by using a random number generation function. At step S502, a link-local address is then generated by assigning the generated random number to the low 64 bits of the link-local address. At step S503, it is determined whether the generated link-local address is already used or not in the local network by using the APR protocol. If already used, the process returns to step S501, where a random number generation (step S501), a link-local address generation (step S502), and collision detection (step S503) are repeated. In the collision detection process, to determine whether a link-local address generated using the random number is already used by another device in the local network, the above-described APR packet is used. That is, an APR packet having the link-local address generated using the random number as an address of a connection requesting device is issued. If a response to the APR packet is received, the link-local address generated using the random number is already used by another device in the local network, that is, the link-local address collides with another one. However, if no response to the APR packet is received, the link-local address does not collide with another one. If it is determined, at step S503, that the generated link-local address is not yet used, the link-local address is encrypted and is embedded in an acknowledge response to the address change request at step S403. At step S404, the acknowledge response is then transmitted.

Additionally, a link-local address is designed for a device to automatically generate it. In the IPv6 specification, a device uses at least one link-local address. Accordingly, in general, a device has an automatically generated link-local address. If, for example, a DHCP (dynamic host configuration protocol) server or an OS (operating system) setting tool assigns a global address to the device, the device further has the global address. In this embodiment, when a global address use is changed to a local address use, the local address is updated by a random number. Consequently, every time the change occurs, the device has a different local address. Since some communication is performed during another communication, communications using a plurality of local addresses may be performed at a time. Therefore, an information processing system may have a plurality of local addresses at a time.

According to the second embodiment of the present invention, a fixed unique address of a communication station (information processing apparatus) is not used for the lower 64 bits of a link-local address, but a number generated by a random number generation function is used. Since the generated number changes every time the function is called, the risk of being subjected to DoS attacks and sniffer attacks from an information processing device in the same network can be reduced.

Additionally, the present invention can be achieved by supplying a recording medium storing program code (software) that achieves the functions of the above-described embodiments to a system or a device and by causing a computer (CPU (central processing unit) or MPU (micro-processing unit)) of the system or device to input and execute the program stored in the recording medium.

In such a case, the program code achieves the specific functions of the above-described embodiments by itself. That is, the program code and a recording medium storing the program code achieve the present invention.

The recording medium for supplying the program includes, for example, a flexible disk, a hard disk, an optical disk, a magneto optical disk, a CD-ROM (compact disk-read-only memory), a CD-R (compact disk-recordable), a magnetic tape, a nonvolatile memory card, and a ROM.

Additionally, in addition to achieving the functions of the above-described embodiments by the computer executing the readout program, the functions of the above-described embodiments can be achieved by a process in which an OS or a basic system running on the computer executes some of or all of the effective functions in response to instructions of the program.

Furthermore, the functions of the above-described embodiments can be achieved by a process in which, after a program read from a recording medium is stored in a memory of an add-on expansion board inserted in a computer or a memory of an add-on expansion unit connected to a computer, a CPU in the add-on expansion board or in the add-on expansion unit executes some of or all functions described in the above-described embodiments.

According to the embodiments of the present invention, when a target of data communication is a device in the same local network, data communication using a local address that does not allow data communication via a data relay device is started. As a result, the risk of being subjected to Denial-of-Service (DoS) attacks that target a global address and sniffer attacks during the communication can be reduced.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An original data communication apparatus in a first local network, the original data communication apparatus comprising:
   a communication unit configured to carry out data communication with a first other data communication apparatus in the first local network and with a second other data communication apparatus in a second local network, the communication unit configured to carry out data communication using a local address for allowing communication with the first other data communication apparatus in the first local network and carry out data communication using a global address for allowing communication with the first other data communication apparatus in the first local network and the second other data communication apparatus in the second local network;
   a detection unit configured to detect a connection request from another data communication apparatus; and
   a control unit configured to, (1) in a case where the another data communication apparatus sending the connection request detected by the detection unit employs the global address and is the first other data communication apparatus in the first local network, request the first other data communication apparatus to carry out communication with the original data communication apparatus by employing the local address without employing the global address, and control the communication unit to carry out the communication with the first other data communication apparatus by employing the local address, and (2) in a case where the another data communication apparatus sending the connection request detected by the detection unit employs the global address and is the second other data communication apparatus in the second local network, control the communication unit to carry out the communication with the second other data communication apparatus by employing the global address.

2. The original data communication apparatus according to claim 1, further comprising:
   a determination unit configured to determine whether the connection request from another data communication apparatus is transmitted via a network relay device for connecting the first local network to the second local network;
   wherein the control unit is configured to determine whether the another data communication apparatus is located in the first local network based on a determination result by the determination unit.

3. A data communication method in an original data communication apparatus, the original data communication apparatus for carrying out data communication using a local network address for allowing communication with a first other data communication apparatus only in the local network and carrying out data communication using a global network address for allowing communication with the first other data communication apparatus in the local network and a second other data communication apparatus in a second local network, the method comprising:
   a detection step, performed by a processor, for detecting a connection request from another data communication apparatus; and
   a control step for, (1) in a case where the another data communication apparatus sending the connection request detected in the detection step employs the global address and is the first other data communication network in the first local network, requesting the first other data communication apparatus to carry out communication with the original data communication apparatus by employing the local address without employing the global address, and controlling the communication unit to carry out the communication with the first other data communication apparatus by employing the local address, and (2) in a case where the another data communication apparatus sending the connection request detected in the detection step employs the global address and is the second other data communication apparatus in the first second local network, controlling the communication unit to carry out the communication with the second other data communication apparatus by employing the global address.

4. A non-transitory computer-readable storage medium storing a computer program comprising program code for causing a computer to execute a data communication method comprising:
   a detection step for detecting a connection request from another data communication apparatus; and
   a control step for, (1) in a case where the another data communication apparatus sending the connection request detected in the detection step employs a global address and is a first other data communication apparatus in a first local network, requesting the first other data communication apparatus to carry out communication with an original data communication apparatus by employing a local address without employing the global address, and controlling a communication unit to carry out the communication with the first other data communication apparatus by employing the local address, and (2) in a case where the another data communication apparatus sending the connection request detected in the detection step employs the global address and is a second other data communication apparatus in a second local network, controlling the communication unit to carry out communication with the second data communication apparatus by employing the global address.

* * * * *